United States Patent
Thiriet et al.

(10) Patent No.: US 12,458,983 B2
(45) Date of Patent: Nov. 4, 2025

(54) DIELECTROPHORESIS DETECTION DEVICE

(71) Applicant: Ecole Polytechnique Federale de Lausanne (EPFL), Lausanne (CH)

(72) Inventors: Pierre-Emmanuel Thiriet, Ecublens (CH); Carlotta Guiducci, Lonay (CH); Gloria Porro, Lausanne (CH); Danashi Medagoda, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 374 days.

(21) Appl. No.: 18/007,919

(22) PCT Filed: Jun. 7, 2021

(86) PCT No.: PCT/IB2021/054981
§ 371 (c)(1),
(2) Date: Dec. 2, 2022

(87) PCT Pub. No.: WO2021/245635
PCT Pub. Date: Dec. 9, 2021

(65) Prior Publication Data
US 2023/0226559 A1    Jul. 20, 2023

(30) Foreign Application Priority Data

Jun. 5, 2020    (EP) .................................... 20178445

(51) Int. Cl.
*B03C 5/00*    (2006.01)
*B01L 3/00*    (2006.01)
(Continued)

(52) U.S. Cl.
CPC ........ *B03C 5/005* (2013.01); *B01L 3/502715* (2013.01); *B01L 3/502746* (2013.01);
(Continued)

(58) Field of Classification Search
CPC ........... B03C 5/005; B03C 5/022; B03C 5/00; B03C 5/028; B01L 3/502761;
(Continued)

(56) References Cited

U.S. PATENT DOCUMENTS

| 2007/0152206 A1 | 7/2007 | Cho et al. |
| 2014/0248621 A1 | 9/2014 | Collins |
| 2017/0008009 A1 | 1/2017 | Azpiroz et al. |

FOREIGN PATENT DOCUMENTS

| EP | 3418373 A1 | 12/2018 |
| WO | 2018073991 A1 | 4/2018 |

OTHER PUBLICATIONS

International Search Report; European Patent Office; International Application No. PCT/IB2021/054981; Jul. 21, 2021; 4 pages.
(Continued)

*Primary Examiner* — J. Christopher Ball
(74) *Attorney, Agent, or Firm* — Taft Stettinius & Hollister LLP

(57) ABSTRACT

A dielectrophoretic detection device including a chip, with a flow channel having at least one inlet and one outlet, and at least a detection area configured to detect analytes trapped on functionalised beads flowing within the flow channel, first and second electrode assemblies shaped as rows of parallel pillars extending a the height of the flow channel, and configured to generate under electric tension an electric field to form an electrical barrier, and preventing the beads to cross the barrier and drawing the beads to the detection area by dielectrophoretic forces where they are clustered and concentrated. The device may be provided with multiple rows of parallel pillars of electrode assemblies extending over the height of the flow channel, forming multiple concentration lines. The flow channel may be provided with further rows of parallel pillars of electrode assemblies
(Continued)

crossing the flow channel in a transverse direction, forming further incubation lines.

10 Claims, 13 Drawing Sheets

(51) Int. Cl.
*B03C 5/02* (2006.01)
*G01N 1/40* (2006.01)

(52) U.S. Cl.
CPC ........ *B01L 3/502761* (2013.01); *B03C 5/026* (2013.01); *G01N 1/40* (2013.01); *B01L 2200/0668* (2013.01); *B01L 2200/10* (2013.01); *B01L 2300/0645* (2013.01); *B01L 2400/0424* (2013.01); *G01N 2001/4038* (2013.01)

(58) Field of Classification Search
CPC ..... B01L 2400/0424; B01L 2200/0668; B01L 2200/0647; G01N 1/40; G01N 30/0005; G01N 2030/0065; G01N 2015/1422; B01J 2219/00853; B01J 2219/00914
See application file for complete search history.

(56) References Cited

OTHER PUBLICATIONS

Written Opinion of the International Searching Authority; European Patent Office; International Application No. PCT/IB2021/054981; Jul. 21, 2021; 9 pages.

DIELECTROPHORESIS DETECTION DEVICE

CROSS REFERENCE TO RELATED APPLICATIONS

This application is a U.S. national stage filing of International Patent Application No. PCT/IB2021/054981 filed Jun. 7, 2021, which claims priority to European Patent Application No. 20178445.1 filed Jun. 5, 2020, the contents of each application are hereby incorporated by reference in their entirety.

FIELD OF THE INVENTION

The field of the invention relates generally to the detection of analytes using dielectrophoresis (DEP) for concentrating locally said analytes. More particularly the field of the invention relates to fluorescent detection of biological analytes bound to functionalized beads flowing in a flow channel of a microchip detection device.

Specifically, the invention concerns a dielectrophoretic detection device comprising a chip, said chip comprising a flow channel having at least one inlet and one outlet, said flow channel having a width and a height and at least a detection area configured to detect analytes trapped on functionalized beads flowing within said flow channel, a first electrode assembly and a second electrode assembly arranged in said flow channel, said first and second electrode assemblies being configured to generate, under an appropriate electric tension therebetween, an electric field drawing said beads to said detection area by di electrophoretic forces.

Further, the invention concerns a fluorescent testing system comprising the aforementioned dielectrophoretic detection device, an excitation light source for radiating light to said beads within said flow channel, a photon detection unit detecting light emitted in said detection area, an electric power unit adapted to provide an adjustable electric voltage to said electrode assemblies and flow means for generating a flow of beads in said channel.

BACKGROUND AND RELATED PRIOR ART

Current approaches for analyte quantification, present in physiological fluids, often rely on the combination of functionalized surfaces and fluorescence detection. Beads are a common choice of surface as they offer high surface-to-volume ratio, thus enabling effective detection of highly diluted biomarkers. However, in order to carry out measurement of the signal, beads need to be localized via image processing or concentrated at a photodetector sensing area. In the prior art, bead concentration is commonly performed either through the use of magnetic fields or by mechanical filters. Also, the use of positive or negative DEP forces is a further technical solution for managing particle's displacements within a liquid, receiving increasing interest. Basics and a review of this technology may be found in the document "A review of polystyrene bead manipulation by dielectrophoresis", Qiaoying Chen and Yong J Yuan, RSC Advances, 9(9); 4963-4981, 2019.

Applying this technology, the patent application US20060219939A1, 2005, teaches to use DEP forces to concentrate 'bioparticles' present in a sample constituted by a droplet, deposited and immobilized in a sample holder, by means of a set of electrodes, e.g. 4 electrodes in a cross configuration integrated in a wall of the sample holder, at a specific location in front of a photodetector, and to detect those bioparticles through fluorescent analysis. This document widely refers to detection of small 'bioparticles' but there is no specific mention of functionalized beads for analytes detection based on sandwich immunoassays.

The patent application US20090283406A1, 2009, discloses the idea and focuses on the trapping of a single bead at a specific location using DEP force. This bead is then usable for the analyte molecules detection through the use of a sandwich immunoassay. This patent is not considering concentration of beads to amplify the fluorescent signal, since it reports operation based on a single bead. No description of the actual layout of the device and electrodes is found is this document.

The document "A bead-based immunofluorescence-assay on a microfluidic dielectrophoresis platform for rapid dengue virus detection", E. Iswardy, T-C Tsai, I-F Cheng, T-C Ho, G C Perng, H-C Chang, Biosensors and Bioelectronics, 174-180, 2017. DOI: 10.1016/j.bios.2017.04.011, teaches the use of DEP forces for concentration of beads labelled with anti-dengue virus antibodies for detection of this virus in highly diluted medium through fluorescence. A so called '3 dimensional approach' is realized with a device of the type mentioned above by placing pairs of V-shaped planar electrodes at the top and the bottom walls of a microfluidic channel for guiding, capturing and clustering the flowing beads. This channel has a cross section with a small height as compared to its width. This approach has a main drawback due to the application of the retaining DEP force from the planar surfaces of the channel. In fact, the force decreases with the distance from each surface and thus limits the height that the channel can have in order to efficiently hold the beads. Notably, low flow operation is reported (0.3 µl/min), likely due to limited retention force. The incubation is carried out on-chip, but on the large cluster already formed in the hollow of one of the V-shaped electrodes during concentration. In this configuration, the beads in the center of the cluster have a limited exposure to the injected analyte, so there is almost no gain from the mass-transport point of view. The document contains no mention of multi-parametric analysis.

The document "Combining dielectrophoresis and concentration polarization-based preconcentration to enhance bead-based immunoassay sensitivity", S Park and G Yossifon, Nanoscale, 2019. DOI: 10.1039/C9NR02506E teaches the use of DEP force for preconcentration of beads at a specific location of a chip. The immobilization is conducted on planar electrodes. Binding of avidin tagged with a fluorophore with biotin beads is monitored through fluorescent detection. The document contains no mention of multi-parametric analysis. Due the use of planar electrodes arranged along the chip walls the concentration of beads can only be carried at extremely low flow (10 nl/min).

Although approaches for bead concentration by DEP have been reported previously as described above, they suffer from limited beads holding forces and limited channel height, thus limited flow of operation. In fact, as they are based on planar electrodes, they can only generate high electro-kinetic forces in close proximity to the top or bottom surface of the chip, i.e. close to the electrodes, limiting the height of the microfluidic channel, which results is a small channel section which limits further the flow rate and additionally allows only a small amount of beads to be trapped. It shall be pointed out that a low flow rate is a serious limiting factor for these systems, since some analytes are present at very low concentrations in human serum and thus flowing a significant volume of sample through the chip is required to capture a sufficient number of analytes to generate a measurable signal.

SUMMARY OF THE INVENTION

The invention is made in view of the aforementioned problems and drawbacks in the related art.

The invention provides a dielectrophoretic detection device comprising a chip, said chip comprising a flow channel having at least one inlet and one outlet, said flow channel having a width and a height and at least a detection area configured to detect analytes trapped on functionalized beads flowing within said flow channel, a first electrode assembly and a conjugated second electrode assembly arranged in said flow channel, said first and second electrode assemblies being configured to generate, under an appropriate electric tension therebetween, an electric field drawing said beads to said detection area by dielectrophoretic forces, wherein said first electrode assembly is constituted by a first row of parallel pillars extending over said height of the flow channel and connected together by a first connecting line, said second electrode assembly is constituted by a second row of parallel pillars extending over said height of the flow channel and connected together by a second connecting line, wherein the pillars of said first and second rows are arranged alternately and parallelly one to the other with a gap therebetween so as to form a first common row, said first common row being configured to generate, under an appropriate electric tension between said first and second connecting lines, an electrical field preventing said beads to cross said first common row and forcing them to slide along said first common row until they reach the detection area.

The pillars of said first row and said second row may be aligned in a first common row crossing obliquely the entire width of said flow channel, thereby forming a first concentration line guiding beads toward a first detection area located at vicinity of a side wall of said flow channel, where they are clustered and concentrated.

The invention offers thus a new solution to carry out the concentration step. The detection of analytes is carried out on the surface of functionalized beads collected at a specific location of a microfluidic channel, using an electric field, wherein this electric field is generated by the standing vertical electrodes evenly spaced in the channel. The field induces dielectrophoretic (DEP) forces on beads flowing through the channel, preventing them to cross the electrical barrier and forcing them to 'surf' on that barrier until they reach the region of detection where they are clustered and concentrated. The use of high aspect ratio electrodes allows for application of electric field over the entire height of the channel, enabling efficient trapping of beads at high flow rates. The terms "vertical" and "height" are used herein for the sake of explanatory simplicity, assuming the channel having two opposite walls terminologically termed "bottom" and "top" walls, linked by two "side" walls, whatever the actual spatial orientation of the entire chip may be. Importantly, the use of vertical electrodes allows to cluster a high number of beads and pile to them up along the entire height of the channel, hence amplifying greatly the signal. This is a fundamental improvement with respect to the application of holding forces by means of simple planar electrodes located in the top and bottom walls, which would exert a DEP force sufficient to cluster the beads only close to the corresponding channel surface. Integrating vertically standing electrodes for generating homogeneous DEP forces across the channel height addresses this issue since vertical electrodes can provide a high electro-kinetic force over the entire height of the channel. The technology used by the inventors for 3D electrodes construction grants high aspect-ratio geometries, namely high height with small footprint, which allows to increase the flow rate, this meaning the total volume injected per unit time in the microfluidic platform, and the number of beads trapped in detection sites. This feature has a fundamental role to target low-concentration analytes detection.

Moreover, this invention can simultaneously target multiple analytes, while employing a single fluorophore, thanks to spatial multiple analytes detection, in a preferred embodiment wherein the flow channel is provided with a second common row of parallel pillars of electrode assemblies extending over the height of the flow channel, forming a second concentration line, guiding beads toward a second detection area located at vicinity of a side wall of said flow channel, said second common row being spaced apart downstream in flow direction from said first concentration line.

Indeed, two or several oblique rows of vertical electrodes can be sequentially placed spaced apart one after the other along the direction of the flow in order to create two or several different concentration areas. Beads of different sizes can be functionalized for different analyte capture. Changing the inter-electrode space between neighbouring pillars and the value of the electric potential at the electrodes among successive concentration rows, beads of different sizes can be concentrated at different locations. Such a feature cannot be easily achieved with common magnetic or mechanical concentration tools. This technique can be applied directly to various physiological liquids, including human serum, and can be used in conjunction with the vast array of surface functionalization techniques available to capture biomarkers, such as metabolites, peptides or nucleotide strands.

Moreover, in addition to the above-mentioned embodiments, the invention can integrate an incubation step on an upstream location in the same microfluidic channel, allowing for the complete assay to be done on chip by means of a dielectrophoretic detection device as outlined above, wherein the flow channel is further provided with a further common row of parallel pillars of electrode assemblies crossing said flow channel in transverse direction, forming an incubation line. Instead of a single incubation line, the device may be provided with several such incubation lines, e.g. two or three lines, with different inter-electrode spaces between neighbouring pillars or different electric potentials applied to electrodes, adapted to beads of different sizes, in order to separate beads of different sizes also during the incubation step.

In this embodiment, a row of pillars arranged across the width of the channel is placed in a line transverse to the flow at upstream to temporarily trap the beads, clustering them along this line. Those small beads' clusters are exposed to the flow of sample containing the biomarker/reagents of interest. When the binding of the analyte is performed in this configuration, the mass transport of the biomarker to the beads bearing the ligands is highly facilitated by convection. The small size of the clusters at this stage and the high mobility of the beads ensure a homogeneous access of the sample to every bead. The features described here allows to process low-concentration samples.

Moreover, the invention can also target multiple analytes on beads, conjugated by different ligands or fluorophores and of different sizes on the same chip and in the same microfluidic channel allowing to perform multiple and multiple-marker assays in the same device. In a further embodiment, the pillars of the first and the second rows of the dielectrophoretic detection device of the invention are alternately aligned in a first common row crossing obliquely the entire or partial width of said flow channel, thereby forming a first concentration line guiding beads toward a first detection area. In the device, the flow channel is provided with a first, a second or more concentration lines guiding beads toward one or more detection areas, and said flow channel is further provided with at least one area of spatial segregation on a bead size basis downstream the one or more detection areas, said detection areas being further configured to focus beads, clustered and concentrated by the one or more concentration lines, on a defined location upstream and at vicinity of the at least one area of spatial segregation on a bead size basis, thereby forming at least one focus area.

Further features and advantages of the invention will appear to those skilled in the art from the dependent claims and from the detailed description of preferred embodiments in relation with the appended drawings.

DETAILED DESCRIPTION OF THE INVENTION

According to the invention, the inventive approach for DEP surfing is based on the use of oblique rows of three-dimensional electrodes placed in a microfluidic channel to polarize and thus repel beads in their proximity by means of negative DEP forces.

Figure 4:
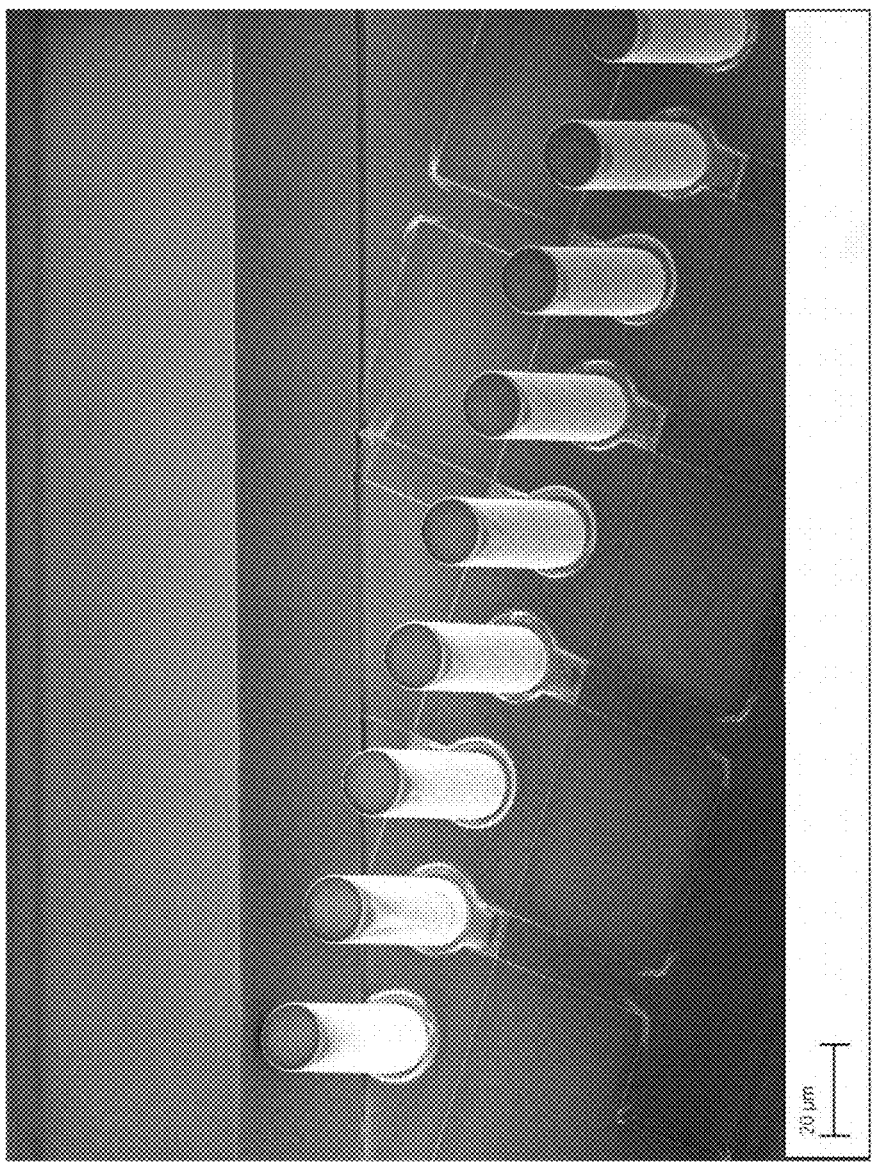
FIG. 4 is a SEM micrograph of pillar shaped electrodes arranged in lines.
Figure 5:
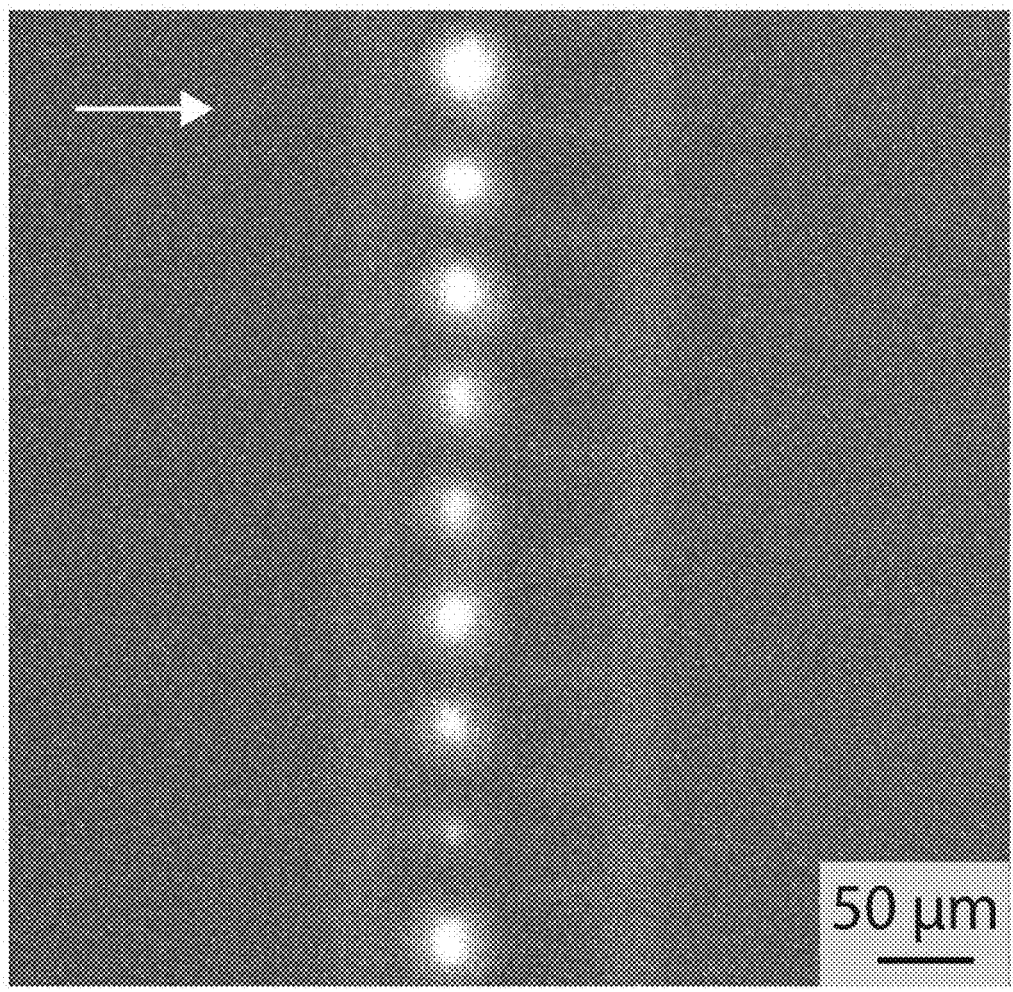
FIG. 5: is a fluorescence image of beads clustered along an incubation line.
Figure 7:
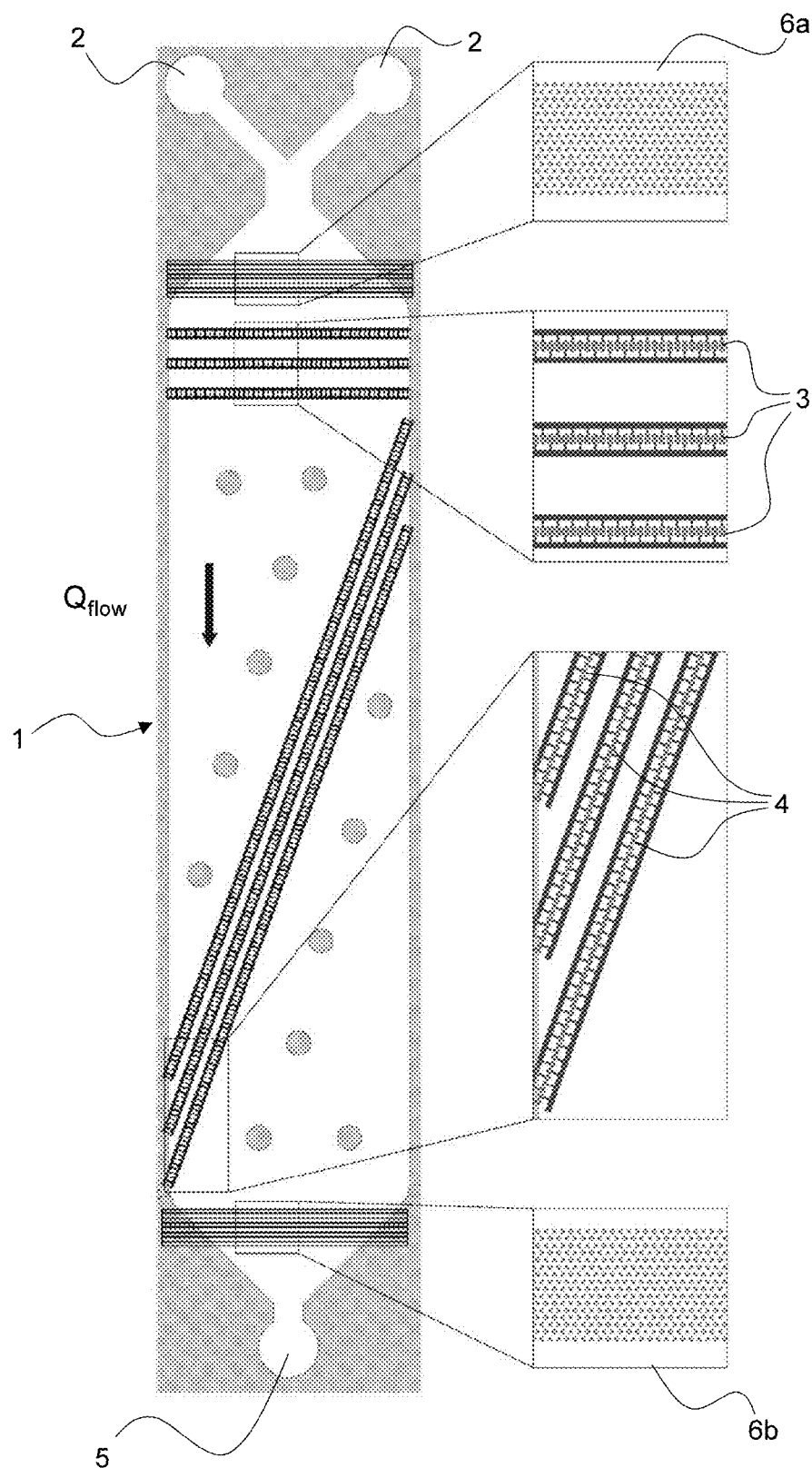
FIG. 7 is a horizontal section illustrating schematically a microfluidic chip design.
Figure 8:
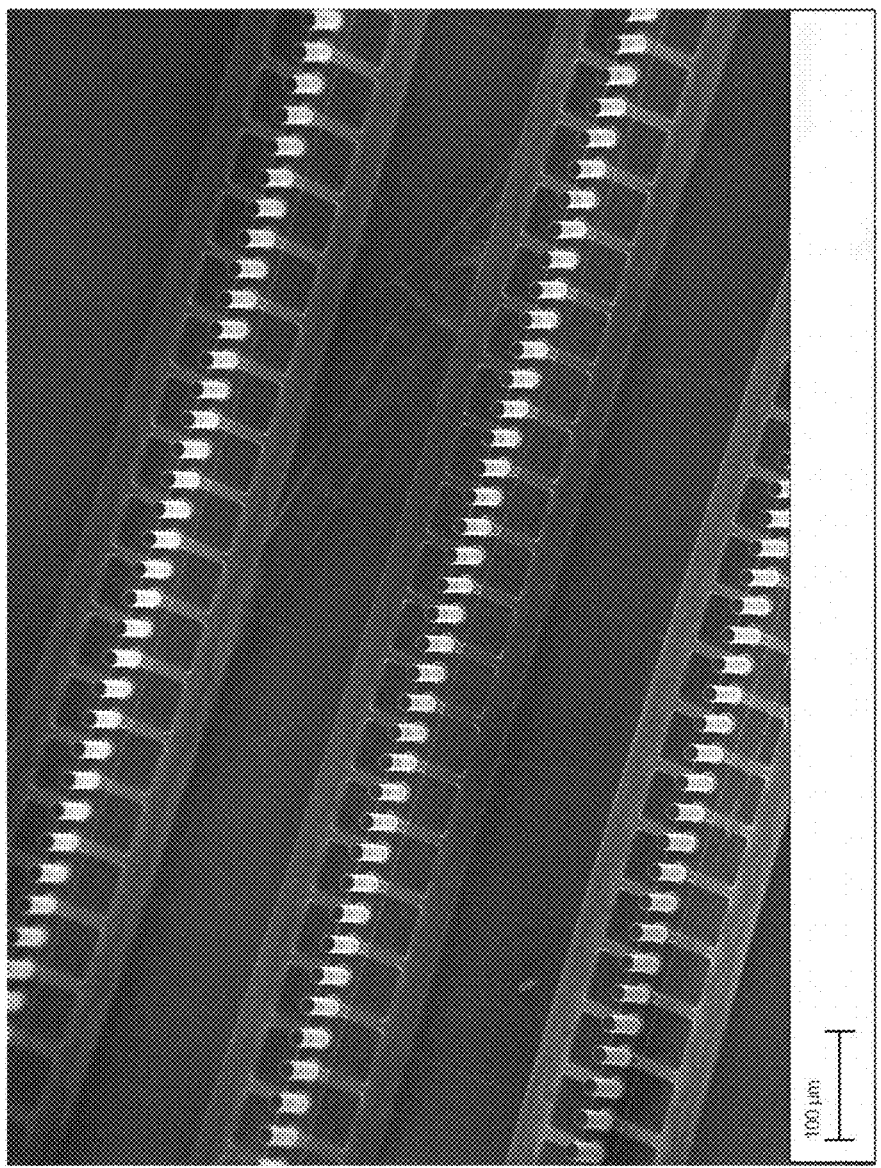
FIG. 8 is a micrograph showing an enlarged partial view of a microfluidic chip design of the type as shown in FIG. 7.

The construction of the 3D microelectrode rows and arrays comprising vertical pillars shown in the micrographs of FIGS. 4 and 8, and their integration into a chip designed as shown in FIG. 7, is performed according to the teaching of the document "Metal-coated SU-8 structures for high-density 3D microelectrode arrays", S. A. Kilchenmann, E. Rollo, P. Maoddi, C. Guiducci, J. of Microelectromechanical Systems, Vol 25, (3), 425-431, June 2016. But it should be noted that this construction method is not the only one that permits an embodiment of the invention. Since the size and inter-electrode space of pillars may vary quite a lot depending on the target application, other construction methods may be implemented for specific applications.

Indeed, this construction method is based on SU-8 photolithography and standard thin-film deposition and patterning techniques, which enables the fabrication of 3D microelectrodes integrated in microchannels. SU-8 allows achieving high aspect-ratio and high-resolution 3D electrode structures. These structures are coated with metal layers, to realize vertical pillar shaped electrodes with low-resistivity connections to planar wires. This technology allows creating 3D pillar shaped electrodes either free-standing or integrated in the channel sidewall and addresses different issues, including the adhesion of the metal layers to the SU-8 and individual connections of single pillars in high-density arrays. The latter is enabled by patterning the connection lines in a lift-off process prior to the fabrication of the 3D structures, avoiding metal patterning inside of the high topography of the 3D electrode arrays, which would limit the density of the connections and the minimum inter-electrode distance. In- and outlets may be located in the sidewalls of the chip; but in order to avoid patterning and critical alignment of the coverslip to the microfluidics, in- and outlets may be located on the backside of the chip, in particular if the thickness of the chip is small.

As may be seen from micrographs of FIGS. 4 and 8, each electrode assembly comprises a planar elongated connecting line, which is integrated in a chip wall, having regularly spaced lateral extensions, thus presenting a comb-like structure. The 3D electrode pillars are disposed on the tips of the teeth-like lateral extensions. Two conjugated electrode assemblies are disposed facing one another, the comb-teeth of the one penetrating into the gaps between the teeth of the other so that their respective 3D electrode pillars form a common row.

Such vertical electrode pillar arrangements allow achieving uniform field strengths over the full channel height and lead to negligible electrical field gradient in the direction normal to the chip surface. Such features, combined with the possibility to singularly address the vertical electrodes, offer significant advantages and new design possibilities in the field of electric-based techniques for lab-on-a-chip devices. Moreover, the use of higher channels and densely packed arrays of pillars holds the promise to scale up the liquid throughput.

One of the new design possibilities involves the further integration of at least one area of spatial segregation of the functionalized beads on a bead size basis taking the advantage of the the Deterministic Lateral Displacement (DLD) technique. Said area of spatial segregation of the functionalized beads on a bead size basis may be a DLD separation area. By taking the advantages of the DEP-surfing technology as described herein to cluster and concentrate the functionalized beads, the invention can integrate one or more step of focusing functionalized beads before processing further the detection and separation of said beads by exploiting DLD technique and principle. Thus the invention can further integrate at least one area of spatial segregation of the functionalized beads on a bead size basis in the same microfluidic channel at a downstream location of the at least one detection area. Said detection area is further configured to focus the functionalized beads being clustered and concentrated downstream one or more concentration lines, each one concentration lines being formed by the common row of parallel pillars of electrode assemblies, and on a defined location at vicinity of the at least one area of spatial segregation of the functionalized beads on a bead size basis. In this embodiment, the at least one detection area forms one or more focus areas, wherein the beads are clustered and concentrated thanks to dielectrophoretic forces drawing the functionalized beads to said one or more focus areas before flowing in the mechanically-based spatial area. The focus area is, indeed, a defined location smaller than the width of the flow channel, upstream and at vicinity of the area of spatial segregation of the functionalized beads on a bead size basis having the same width as the flow channel.

The side wall of the flow channel represents one of the extremities of the width of said mechanically-based spatial separation area, which extends across the entire width of the flow channel. The focus area is a defined location having an area smaller than the width of the flow channel. The defined location of the focus area may be at vicinity of the side wall of the flow channel and upstream the area of spatial segregation or at a defined point upstream and along the width of the area of spatial segregation. Focusing clustered and concentrated beads at vicinity of the area of spatial segregation of the functionalized beads on a bead size basis allows constraining the entrance of said beads to a defined and narrow location on the width of said area of spatial segregation to assist and/or correct the predict trajectories of said functionalized beads in the spatial segregation area. When two or more areas of spatial segregation of the functionalized beads on a bead size basis are provided and integrated as described herein, said segregation areas are successively placed in the flow direction.

The one or more concentration lines guiding the beads toward at least one focus area form thereby one or more focus lines constituted by one, two or several oblique rows of vertical electrodes, crossing partially or entirely the width of the flow channel. Indeed, the one or more focus lines are formed by one or more common rows of parallel pillars of electrode assemblies extending over the height of the flow channel. Two or more focus lines may be sequentially placed spaced apart one after the other along the direction of the flow, as described somewhere herein, to create at least one or more focus areas at vicinity of the side wall of the flow channel upstream the mechanically-based spatial separation area. Alternatively, two or more focus lines can be arranged in a funnel shape or V-shape in the direction of the flow allowing the guiding of the beads through dielectrophoretic forces toward the one or more focus areas upstream and on a defined point located along the width of the area of spatial segregation of the functionalized beads on a bead size basis. Two or more pairs of focus lines arranged in a funnel shape or V-shape can be sequentially placed spaced apart one pair after the other, behind the other or next to the other along the direction of the flow to create one or several focus areas along the width of the mechanically-based spatial separation area. One or more focus lines may obliquely extend over the partial or the entire width of the focus zone formed by the area included between the last incubation line of the incubation zone and the beginning of the area of spatial segregation.

The area of spatial segregation of the functionalized beads on a bead size basis comprises a regular arrangement of microfluidic restrictions formed by one or more rows of three-dimensional pillars extending over the height of the flow channel and being arranged at an angle with respect to the flow direction to create a displacement angle. Said arrangement forms an array configured to control the trajectories of the beads through the creation of separate flow laminae. The trajectories of the beads are then determined by their sizes and the design and the geometry of said array according to the DLD principle or technique. Briefly, beads below a critical size determined by the array geometry transit longitudinally parallel to the flow through the area of spatial segregation, whereas beads above the critical size follow the array displacement angle and, therefore, are spatially separated from the beads below the critical size. The beads sorted by their size are accumulated or concentrated in an accumulation zone located downstream the one or more areas of spatial segregation on a bead size basis.

The accumulation zone comprises functionalized beads extracted from the initial mixture based on their size after flowing into the area of spatial segregation. Accordingly, the beads sorted by their size are then trapped in accumulation zones, each one corresponding to a cluster of sorted beads of a specific size and/or conjugated with one or more specific markers. The accumulation zones are placed downstream the last area of spatial segregation of said beads on a bead size basis, or after the DLD module existing location. Said accumulation zones are configured to detect the analytes trapped on the functionalized beads being clustered and concentrated after being sorted by the spatial segregation areas in order to amplify the signal, which can be detected and monitored by readout means or device, such as in a fluorescent testing system as described above.

Figure 2:
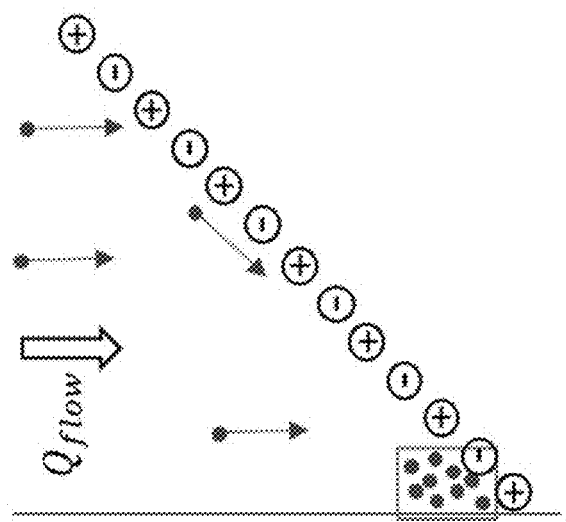
FIG. 2 is a schematic drawing illustrating the principle of DEP surfing.
Figure 2:
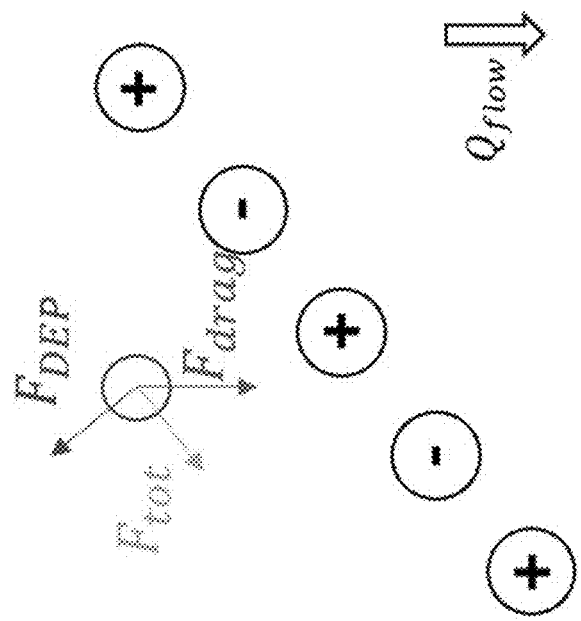
Figure 6:
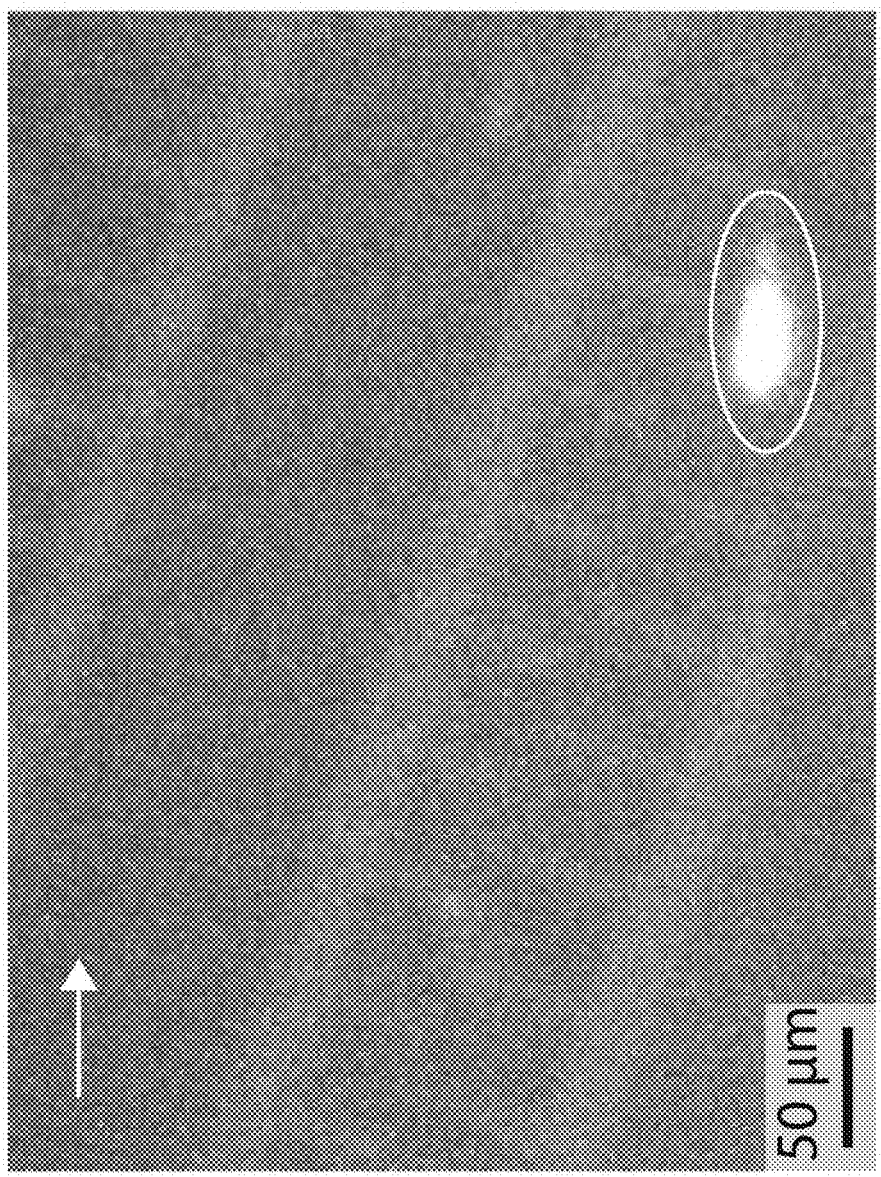
FIG. 6 is a fluorescence image of clustered beads in a concentration area after surfing.

Without being bound by theory, the so called "surfing" of beads having sizes in the micrometer range will now be cursorily explained: As shown on the left part of FIG. 2, a bead in a flow $Q_{flow}$ within a channel experiences a drag force $F_{drag}$ pushing it forward in the channel. As the bead arrives close to the oblique line of the + and − electrode pillars it is subjected to a repulsive nDEP force $F_{DEP}$ due to the DEP field, as illustrated on the left part of FIG. 2 The bead is thus deflected according to the resultant force $F_{tot}$. Indeed, for beads having lower sizes, e.g. in the nanometer range, other forces, like thermal agitation forces will play a role, but the practical effect of the inventive device remains similar: As illustrated on the right part of FIG. 2, the oblique line of pillars, called a concentration line, will form an electric barrier when the electric field is activated. This results in a 'surfing' phenomenon from pillar to pillar bringing the bead towards the side of the microfluidic channel, where it stops. As this nDEP force is experienced by all the beads of a given size injected within the microfluidic device, they are all guided towards the same area highlighted by a rectangle, resulting in a clustering and concentration effect. The signal of this cluster can then be measured optically, in particular through fluorescence microscopy. FIG. 6 is a fluorescence image of clustered beads in such a concentration area after surfing.

Surfing was realized and observed for beads having a diameter ranging from 2 µm to 15 µm, nevertheless, varying the distance between the electrode pillars and the voltage of the electrodes, this range could be extended. Experiments showed that the angle between the direction of the flow and the oblique row of pillars has to range from 5° to 35°, and preferably 15° to 25°, to obtain an efficient surfing and concentration of beads. An angle of 45° was tested but did not give the desired surfing in the channel.

Figure 1:
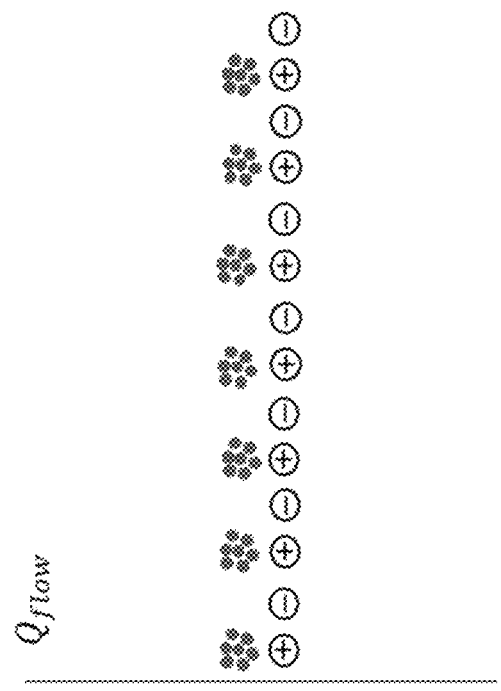
FIG. 1 is a schematic drawing illustrating the principle of DEP-controlled incubation.
Figure 1:
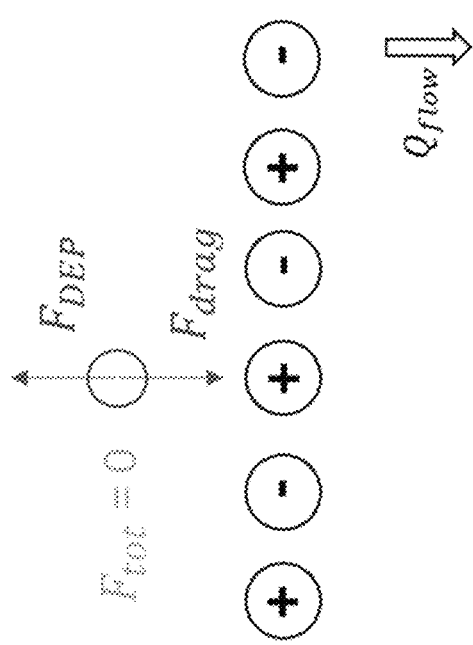

FIG. 1, left part, is a schematic drawing illustrating a bead in a flow $Q_{flow}$ encountering a transverse row of electrode pillars, perpendicular to the flow direction. The resultant force experienced by the bead, balancing $F_{DEP}$ and $F_{drag}$, must be 0 to allow for the bead to be held in place by the electric field. As illustrated by the right part of FIG. 1, several clusters of beads will be blocked at the transverse row of electrode pillars, called an incubation line, and held in place, e.g. for the subsequent injection of a biomarker and a fluorophore. The binding can then be observed through fluorescence microscopy. FIG. 6 is a fluorescence image of clustered beads at such an incubation line.

The images 5 and 6 represent standard fluorescence images of the bead clusters as used for analysis. The arrows show the direction of the flow and the scale bar is 50 µm. Image 6 shows the image at the region of interest where the signal is measured.

FIG. 7 is a schematic drawing of a microfluidic chip design. The overall structure of the chip 1 is made of SU-8, defining the walls of the microchannel and support structures. The chip presents 4 functional zones emphasized in the drawing by enlarged portions: an inlet zone with two inlets 2, an incubation zone with three transverse incubation lines 3, a concentration and detection zone with three oblique concentration lines 4, and an outlet zone with one outlet 5. The three dark lines within the channel correspond to the rows of pillars seen in the micrograph of FIG. 8. In addition, the microchannel is provided with an inlet filter 6a and an outlet filter 6b in order to prevent possible contamination and clogging of the incubation and concentrations areas.

Figure 3:
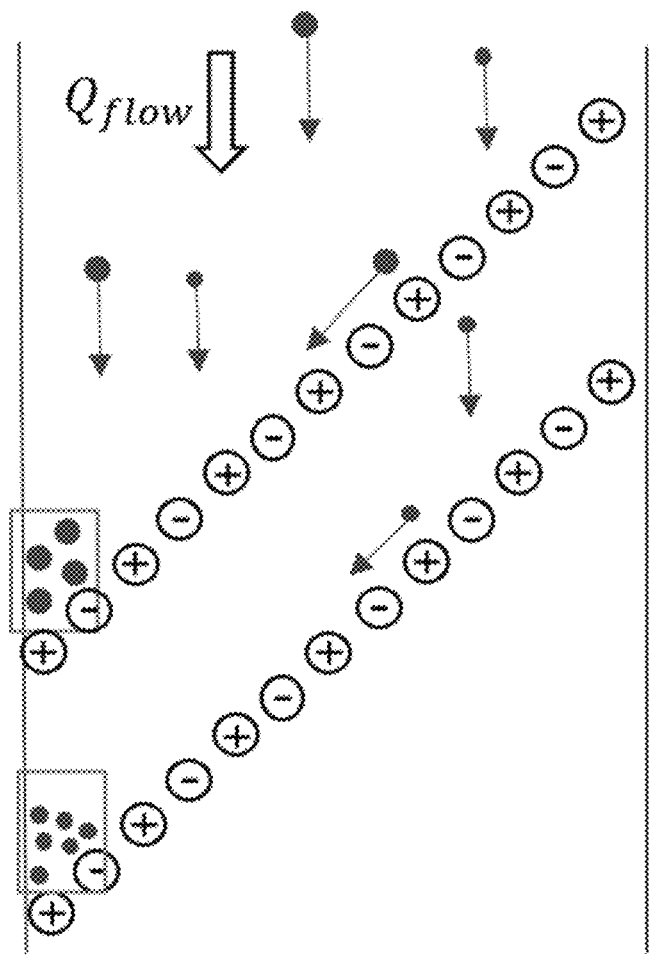
FIG. 3 is a schematic drawing illustrating the principle of multiple biomarker detection using DEP surfing.

While beads of a given size can be concentrated at a specific location using one concentration line of electrode pillars, placing sequentially multiple lines one after the other creates multiple concentration areas. Beads of different sizes functionalized with different capture biomolecules can be concentrated at different locations as shown schematically on FIG. 3, by changing the gap between pillars and electric potential at the electrodes in different lines. Indeed, the force sensed by a bead approaching a line of pillars depends on its size and on the electrical potential applied between electrodes.

Example 1: Implementation of the Chip Design

An embodiment of the device is composed of six lines of electrodes, of which three transversely arranged for on-chip binding of beads with analytes, and three oblique lines downstream of the former, tilted at an angle of 20° with respect to the flow direction for and devoted to the concentration of the beads. The chip includes two inlets to allow for efficient exchange of solutions in the main channel.

This device was used to demonstrate the feasibility regarding the concentration of functionalized beads, the concentration of beads of different size in different locations and the possibility to carry out analyte binding directly on-chip.

Example 2: On-Chip Concentration of Beads for Immunoassay Applications

Regarding the functionalization, a standard sandwich immunoassay on beads was carried out to observe the effect of beads concentration on antigen detection. The sandwich immunoassay in this example aims for the detection of a kidney injury marker, named Cystatin-C. The immunoassay includes a capture antibody attached to the beads, the Cystatin C antigen and a detection antibody labelled with a fluorescent dye. Streptavidin-coated polystyrene beads were incubated with a biotin-conjugated anti-Cystatin C antibody overnight in order to attach the capture antibodies to the beads. These beads were then diluted and incubated with the antigen, Cystatin C, and the detection anti-Cystatin C antibody for times varying from 15 minutes to 24 hours. All experiments were carried in a 5-times diluted fetal bovine serum. The antigen concentration varied from low (ng/mL) to medium (µg/mL) ranges to obtain a calibration curve around the clinical relevant threshold for Cystatin C, 1 µg/ml. The concentration of the detection antibody was double than that of the highest Cystatin C concentration for all binding experiments, ensuring the same noise level.

A fraction of this product was spread on a counting chamber to acquire the fluorescence of single beads. On the other hand, most of the solution was injected into the microfluidic chip and the beads were concentrated in the dedicated area of the device via DEP-surfing. The fluorescence intensity of the bead clusters was then measured, showing a dramatic increase in signal by a factor of about 5, due to the beads' concentration, improving both the sensitivity and the limit of detection of the detection system.

The biomarker detection conducted here with a sandwich immunoassay can be extended to the detection of any biomarkers on the surface of a functionalized bead. This approach based on the DEP surfing mechanism can be applied to beads independently of their specific functionalization and on a wide range of bead size. Consequently, this approach can be applied in numerous diagnostic assays.

Example 3: Multi-Analyte Detection Based on the Use of Beads of Different Sizes and Cross Contamination Characterization To quantify the efficiency of separation of beads by DEP according to their size concentration experiments with fluorescent beads of different sizes emitting in different fluorescent channels are carried out. 6 µm beads fluorescent in a green channel, Y3, were purchased, while 2 µm beads were prepared by conjugating Alexa Fluor 647, fluorescent in the red channel of Y5, to the 2 µm beads using biotin-streptavidin binding. These two types of beads were mixed in 5× diluted fetal bovine serum in equal amounts and injected into the microchannel. Green and red fluorescence, indicating the presence of their respective beads, was measured in both cluster areas. At a flow between 0.5 and 10 µL/min, the DEP force that the beads encountered on the first concentration line was optimized by varying the frequency and amplitude of the AC signal to trap the 6 µm beads which require less force to surf. Higher DEP force was applied to the second concentration line to trap the 2 µm beads.

Figure 9:
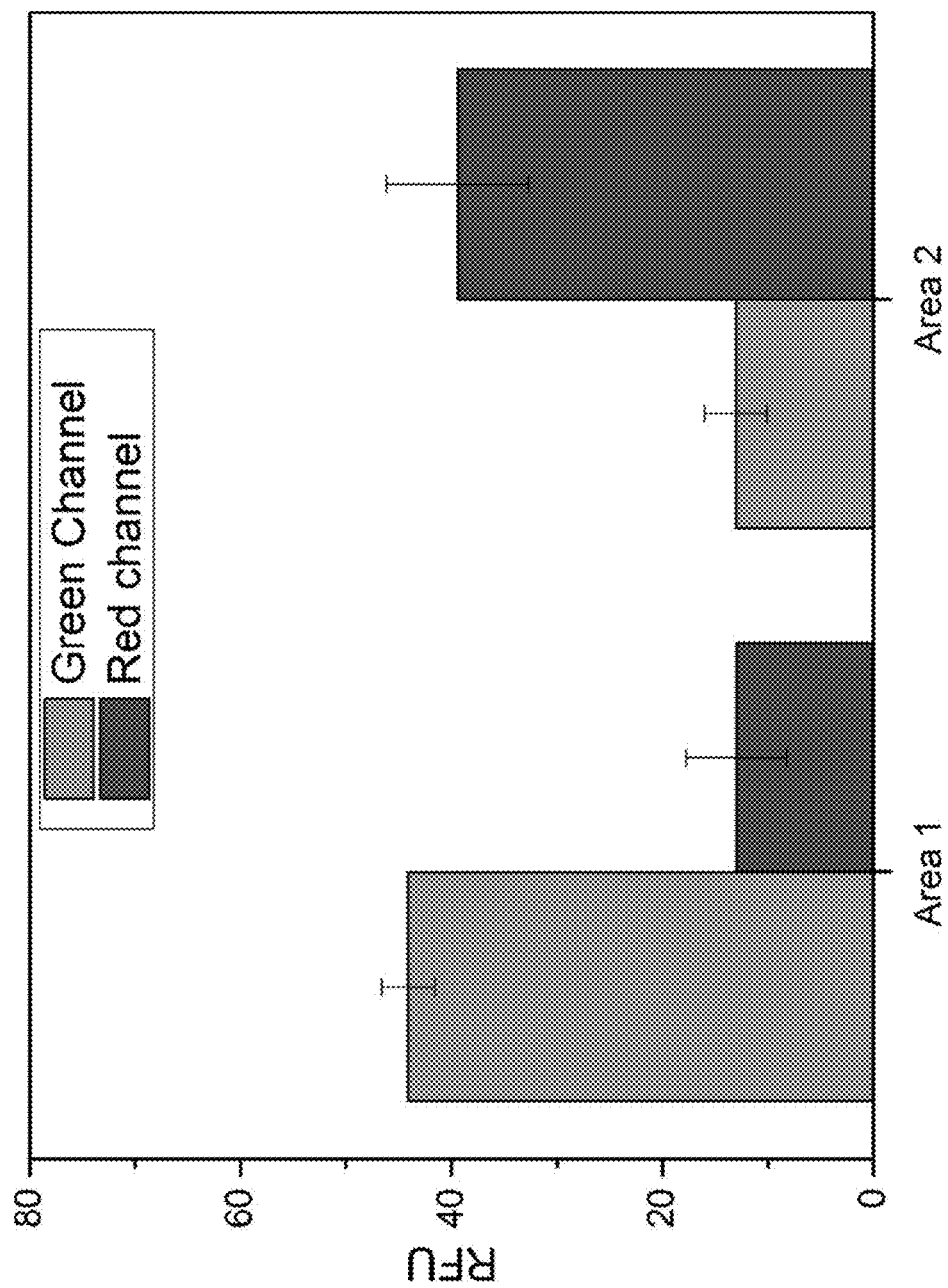
FIG. 9 is a graph showing bead's contamination after on-chip DEP controlled bead separation.

FIG. 9 shows the respective signals from each fluorescence channel in the regions where each bead size should be trapped. The first line contains mostly larger beads, with a small signal from the red channel indicating that some smaller beads were trapped as well in this area. The second line shows a majority of red beads, with minor green fluorescence. This cross-contamination can be optimized by tuning the flow rate and electric potential to minimize the amount of cross-contamination of the beads. This result demonstrates the capability of the system to spatially separate clusters of beads having different sizes, which can be specifically functionalized to detect various analytes.

Example 4: Dep-Controlled on-Chip Incubation of Beads

Figure 10:
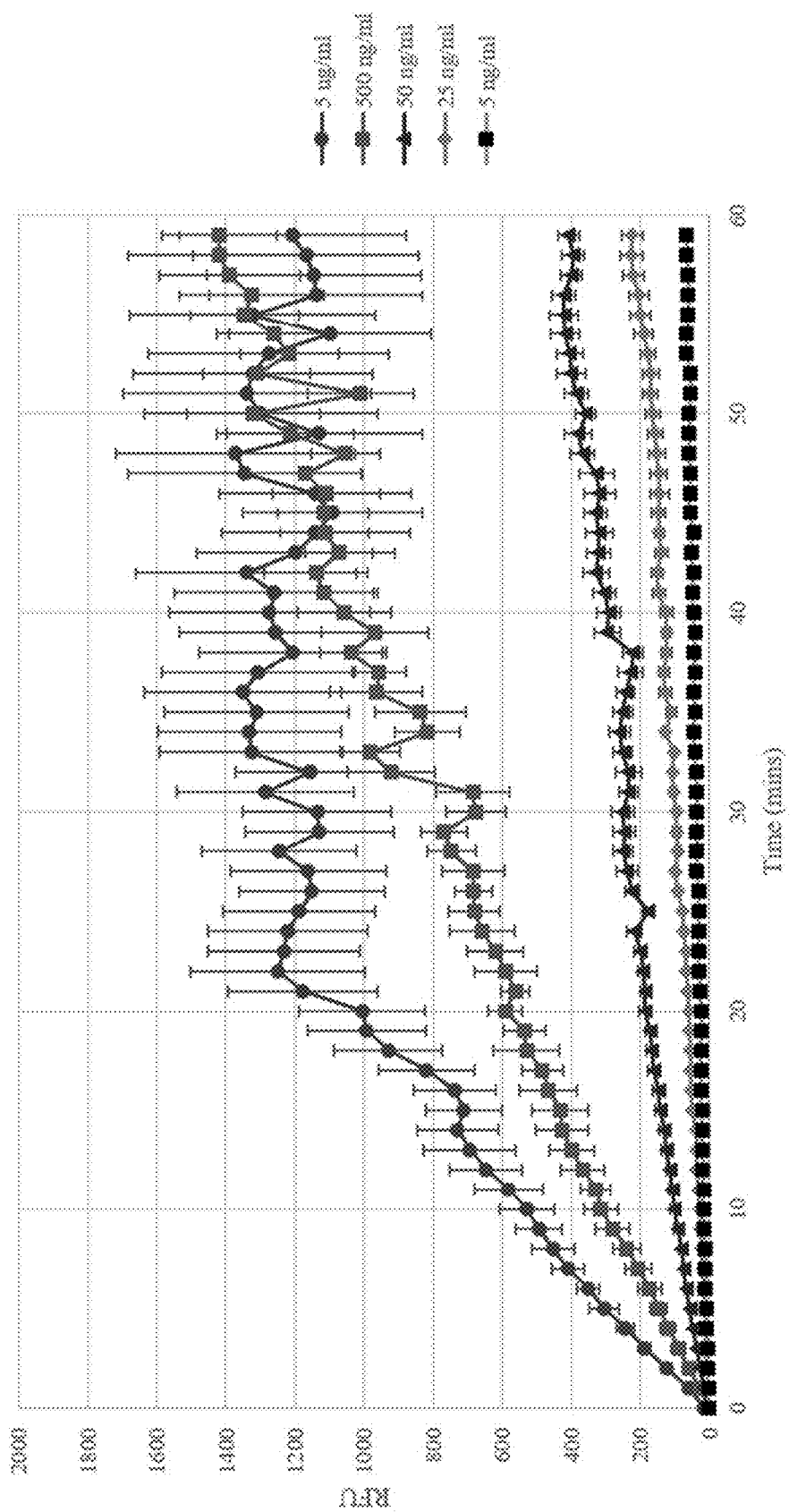
FIG. 10 is a graph showing on-chip binding of fluorescently labelled biotin to streptavidin functionalized beads.

First, beads had to be immobilized in small beads clusters through DEP force on transverse lines of 3D electrode pillars. Then the solution containing a fluorescent probe was injected, and, as the probes were brought in contact with beads, an increase of the fluorescent signal could be observed. The biotin-conjugated fluorophore was flushed through the microchannel and was bound to the polystyrene beads via biotin-streptavidin binding. All compounds were mixed in 5× diluted fetal bovine serum to optimize DEP force and protein interactions. The exposure of the fluorophore-biotin solution to the beads was done up to 1 hour and fluorescence measurements were taken every minute. The results are shown on FIG. 10. There is a linear increase of the signal upon incubation time, reaching a final value within 20 to 60 minutes, depending upon concentration. Further, there is clear separation between different fluorophore concentrations within the first five minutes of incubation: this can be used to quickly quantify the amount of an analyte in an unknown sample.

The above examples show that the limit of quantification of analytes is improved by performing the assay on the surface of beads (homogeneous assay) versus using simple planar surfaces (heterogeneous assays). This is due to the high surface to volume ratio they exhibit. Nevertheless, issues of non-homogeneity of biomarker binding on clustered beads might occur due to limited diffusion and access to the beads located at the center of the cluster. This is also why many systems in the prior art perform binding in a bulk configuration (for instance in vials or on beads spread on dishes) and later they cluster the beads for the detection of the fluorescence signal at the end-point of the reaction. The configuration proposed here for on-chip binding upstream of the clustering locations, allows a continuous delivery of target species to the beads, which solves the mass transport issues and enables a fast and sensitive detection of analytes in low concentrations.

In summary, through the characterization by means of our prototypes the inventors proved the feasibility of all the key aspects of the invention, namely the observation of an amplification upon concentration of beads with DEP, the separation of beads of different sizes in different clusters in order to carry out detection of different markers within one experiment and the on-chip incubation of beads with antigens tagged with fluorescent antibodies.

As disclosed hereinabove, the 'surfing' of beads on the electrical barrier created by vertical electrode pillars is shown for the first time. The tunable nature of the DEP force allows for bead cluster size to be regulated relative to the flow. Integrating vertical standing electrodes for generating homogeneous DEP forces across the channel height addresses this issue since vertical electrodes can provide a high electro-kinetic force over the entire height of the channel. The technology for 3D electrodes grants high aspect-ratio geometries (high height with small footprint), which allows to increase the flow rate, this means the total volume injected per unit time, in the microfluidic platform, and the number of beads trapped in detection sites. This feature has a fundamental role to target low-concentration analytes detection. The data obtained with the above devices show improved results compared to what is described in the art. In particular, beads (10 µm in diameter) can be trapped at a rate of 10 µl/min, which is more than an order of magnitude bigger than what reported in literature. The concentration of functionalized beads exposed to antigen and detection antibodies shows an increased signal leading to an increased sensitivity and limit of detection.

This invention offers for the first time to detect different analytes on the same platform by the use of beads of different size. Beads of different size are functionalized to capture different biomolecules and immobilized at different locations of the chips where the detection fluorescent signal is measured. This allows to employ a single fluorescent wavelength for the entire test, while providing quantitation of multiple analytes at the same time. This avoids the use of multiple fluorophores in the same assay, which has many advantages, for instance, reducing the number of optical components. In fact, with the integrated single-fluorophore solution, the detection of multiple analytes on a single device is straightforward and avoids cross talk effects between different fluorophores. In this case, the discrimination between analytes is based on the beads' sizes.

Moreover, thanks to the technology disclosed herein for generating electrokinetic forces homogeneously over the entire height of a channel, the invention overcomes a common drawback of DEP-based platforms, i.e. the need to limit the ionic force of the solution. With previous DEP-based technologies for particles manipulation, human serum would have to be diluted more than ten times, thus reducing the concentration of analyte in the assay and worsening the binding efficiency. The present device has successfully performed bead collection on only 5× diluted serum, which is the dilution factor commonly used in commercial biomarker assays based on magnetic approaches or mechanical concentration. In fact, a slight dilution is a proven effective compromise to reduce matrix effects (interference by the abundance of non-specific molecules present in the sample) while maintaining favorable chemical conditions for binding.

Example 5: Microfluidic Chip Design for Multi-Marker Assays on Beads

Figure 11:
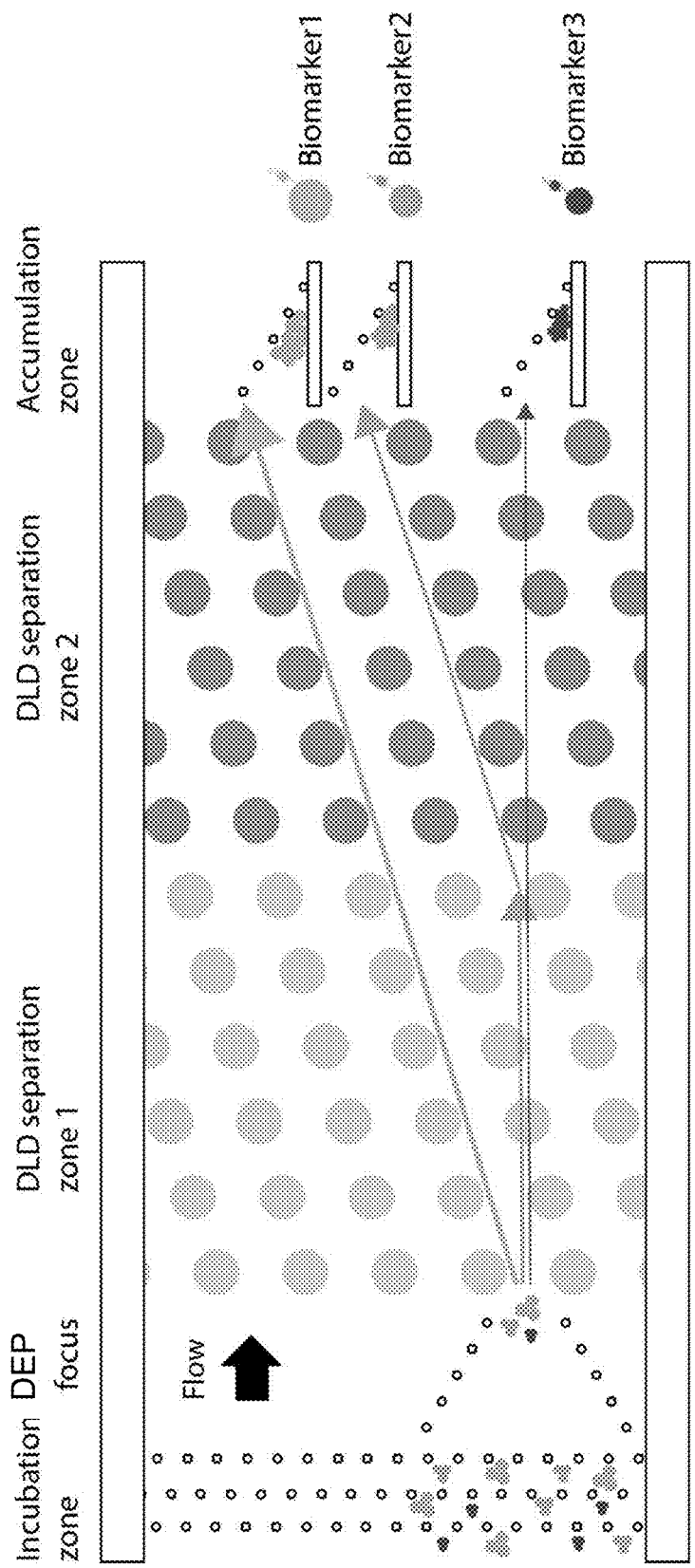
FIG. 11 is a horizontal section illustrating schematically a microfluidic chip design for multi-marker assays on beads integrating an incubation zone as illustrated on FIG. 7, a DEP focus area using DEP surfing technology upstream several areas of spatial segregation on a bead size basis (DLD separation zones), i.e. areas using the Deterministic Lateral Displacement (DLD) microfluidic technique for further segregating beads on a size basis, and, downstream these latter areas, an accumulation zone of the functionalized beads separated by their different sizes and conjugated ligands aggregated in different clusters for readout.
Figure 12:
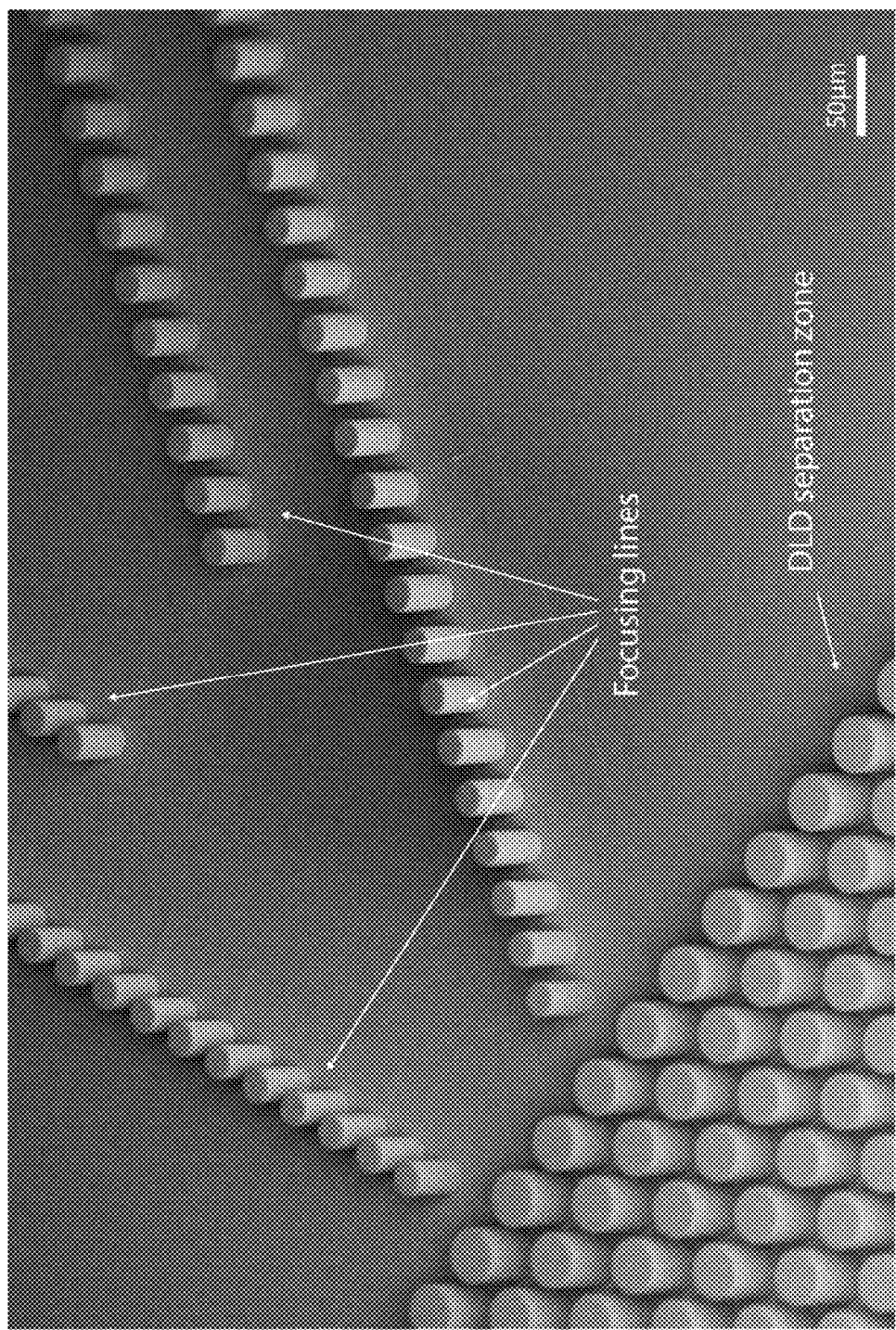
FIG. 12 SEM image of the DEP focus area and the DLD separation zone of a dielectrophoretic detection device illustrated in FIG. 11, the DLD separation modules, consisting of regular arrangements of cylindrical pillars.
Figure 13:
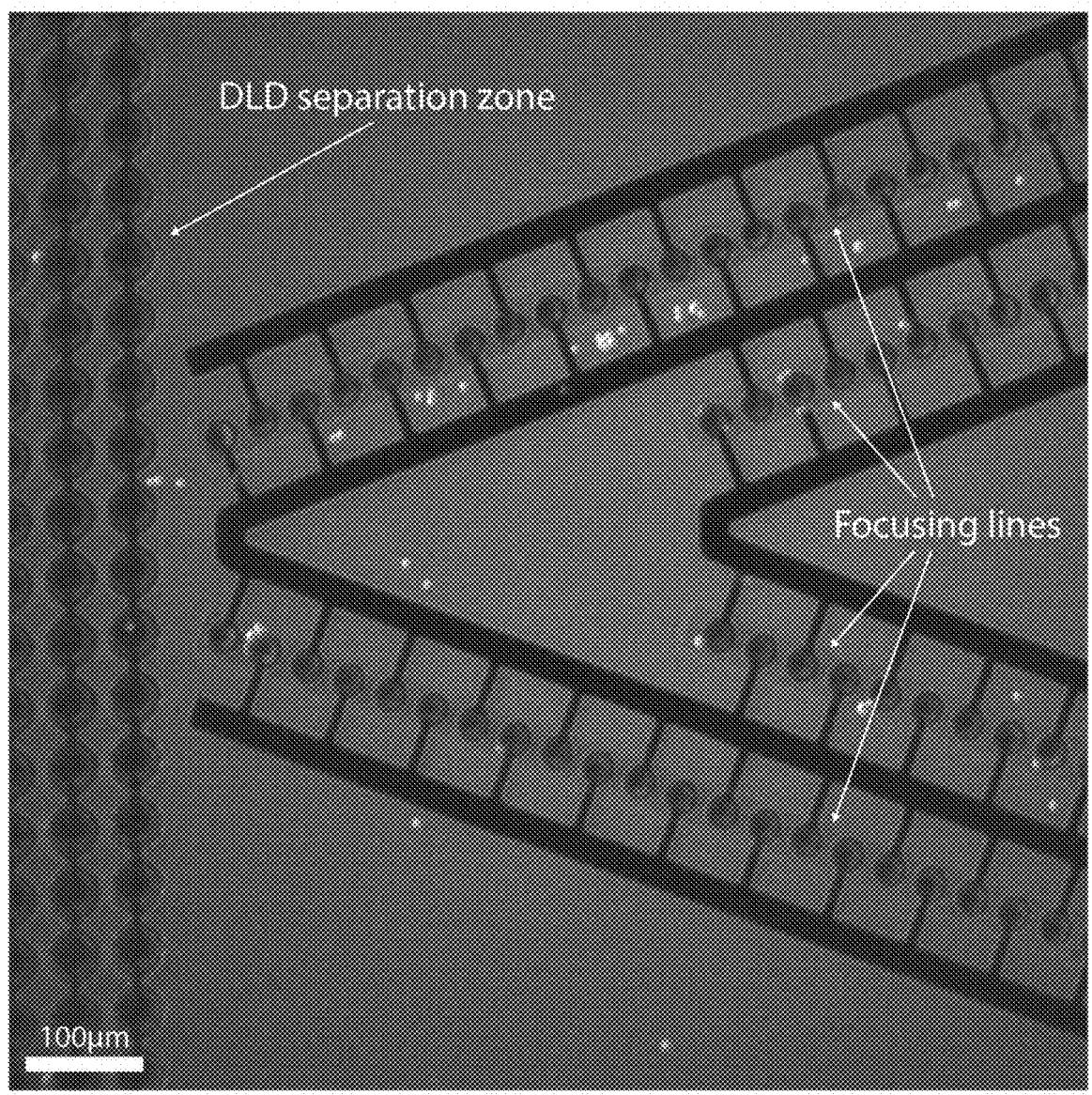
FIG. 13 Image of microbeads conveyed at the entrance of the DLD separation zone by DEP-surfing function achieved by the oblique focusing lines

A further embodiment of the device, in particular for multi-marker immunoassay testing, includes an incubation zone, a DEP focus area, DLD separation zones and for spatial multiplexing and accumulation for amplified readout signal (FIG. 11). The incubation step is performed in the incubation zone being the first active region in the microfluidic chip upstream the DEP focus zone. The incubation zone comprises or consists of one or more incubation lines crossing said flow channel in transverse direction as described herein. The different beads conjugated with capture ligands are retained by dielectrophoretic forces against the convective flow carrying binding analytes. In the DEP focus zone, successive focusing steps are performed, ensuring that the clustered and concentrated beads downstream the focus lines (FIG. 12) enter into the DLD separation zone being a mechanically-based spatial separation zone, at a well-defined starting point. The focusing step is a critical step to achieve efficient separation by the DLD separation zone comprised in the DLD module. The focusing step allows to constrain the entrance of the various beads sets into the pillars array of the DLD module through a defined and narrow location on said array. This focusing step is achieved by taking the advantage of DEP-surfing principle and the oblique arrangement of the common rows of electrodes assemblies. The focus lines can be arranged in a funnel shape to convey the beads at a defined point corresponding to the entrance of the DLD array (FIGS. 12 and 13).

The clustered and concentrated beads focused on a well-defined point (focus area) upstream the pillars array of the DLD module enter and flow into said array. The DLD module consists of series of DLD separation zones (FIG. 11, DLD separation zones 1 and 2), each zone having the capability of extracting beads of a specific size (i.e. bearing a given marker) from the initial mixture. The beads sorted by their size are then trapped in accumulation zones, each one corresponding to a cluster of sorted beads of a specific size. The accumulation zones are placed downstream the DLD module existing location.

DLD separation zones are based on regular arrangements of microfluidic restrictions, i.e. 3D pillars extending the height of the microchannel. Rows of three-dimensional posts crossing transverse the flow channel are embedded into a microfluidic channel, arranged at an angle with respect to the flow direction. The in-flow beads trajectories in the DLD array are determined by the beads size and by the design of the array. In fact, particles below the critical size, defined by the array geometry, transit through the device longitudinally parallel to the flow, whereas particles above the critical size follow the array displacement angle, and consequently are spatially separated from the first ones. Through the application of this method, beads of various sizes are driven to precise locations on the chip. The introduction of series of DLD separation zones with different critical sizes allows to sort more than two populations of beads (FIG. 11).

The devices were fabricated in the CMi cleanroom according to the teaching as above described. The microfluidic chip is composed of a SU-8 microchannel patterned onto a glass substrate, sealed on the top by a PDMS cover.

The pillars array of DLD separation zones is obtained by a regular arrangement of 3D pillars. In the device of FIG. 12, only one DLD separation zone is integrated. Therefore, only two sets of beads can be separated. Furthermore, the focusing module includes three different couples of funnel-shaped diagonal lines, employed simultaneously in order to increase the efficiency of beads deflection. FIG. 12 shows an SEM image of two focusing lines located at the entry of the DLD separation array.

The performance of the focusing module and the DLD separation module was evaluated by flowing polystyrene beads of 6, 8 and 10 µm in diameter at various flow rates (ranging from 0.3 to 1 µL/min) and with different waveforms of the applied DEP electric field (20 Vpp at 1-10 MHz). The experiments were conducted in 5×-diluted fetal bovine serum.

The focusing module has been proven effective in directing the beads towards the desired spatial location at the entrance of the DLD array, as shown in FIG. 13 for the case of 8 µm beads. The beads followed the trajectories determined by the DLD effect resulting in their separation according to their size and got collected at the expected accumulation zone.

A further embodiment of the device includes the activation of the passive pillars of the DLD array by replacing the same by three-dimensional electrodes for di electrophoretic applications. In this configuration, the active pillars can be arrayed in the microfluidic chip obtaining a DEP-assisted DLD device, where the trajectories of the beads can be electrokinetically tuned in real-time. Accordingly, the critical size of the DLD separation zone can be adjusted by means of the dielectrophoretic force applied through the three-dimensional electrodes.

The integration of the aforementioned modules enables to perform sequentially all the different steps of the assay. Such automatization of the beads processing avoids the need of any user intervention.

The invention claimed is:

1. A dielectrophoretic detection device comprising a chip, said chip comprising a flow channel having at least one inlet and one outlet, said flow channel having a width and a height and at least a detection area configured to detect analytes trapped on functionalized beads flowing within said flow channel, a first electrode assembly and a second electrode assembly arranged in said flow channel, said first and second electrode assemblies being configured to generate under an appropriate electric tension therebetween an electric field drawing said beads to said detection area by dielectrophoretic forces, wherein said first electrode assembly is constituted by a first row of parallel pillars extending over said height of the flow channel and connected together by a first connecting line, said second electrode assembly is constituted by a second row of parallel pillars extending over said height of the flow channel and connected together by a second connecting line, wherein the first and second connecting lines are planar, elongated and integrated in the chip wall and have regularly spaced lateral extension forming a comb-like structure comprising teeth-like lateral extensions, and wherein the parallel pillars of the first and second rows are respectively disposed on the tips of the teeth-like lateral extensions of the first and second connecting lines, wherein the pillars of said first and second rows are arranged alternately and parallelly one to the other with a gap therebetween so as to form a common row, said common row being configured to generate, under an appropriate electric tension between said first and second connecting lines, an electrical field preventing said beads to cross said common row and forcing them to slide along said common row until they reach the detection area, and wherein the pillars of said first row and said second row are alternately aligned in a first common row crossing obliquely the entire width of said flow channel, thereby forming a first concentration line guiding beads toward a first detection area located at vicinity of a side wall of said flow channel, where they are clustered and concentrated.

2. The dielectrophoretic detection device according to claim 1, wherein said first common row is straight and forms an angle of between 5° and 35° with the flow direction of the flow channel.

3. The dielectrophoretic detection device according to claim 2, wherein said straight first common row forming an angle of between 15° and 25° with the flow direction of the flow channel.

4. The dielectrophoretic detection device according to claim 1, wherein the flow channel is provided with at least a second common row of parallel pillars of electrode assemblies extending over the height of the flow channel, forming an at least second concentration line, guiding beads toward at least a second detection area located at vicinity of a side wall of said flow channel, said at least second common row being spaced apart downstream in flow direction from said first common row.

5. The dielectrophoretic detection device according to claim 4, wherein a said second common row of electrode assemblies is arranged parallelly to said first common row of electrode assemblies.

6. A fluorescent testing system comprising the dielectrophoretic detection device according to claim 1, an excitation light source for radiating light to said beads within said flow channel, a photodetector detecting light emitted in the detection area, an electric power supply providing an adjustable electric tension to the electrode assemblies and one or more inlets and outlets.

7. A dielectrophoretic detection device comprising a chip, said chip comprising a flow channel having at least one inlet and one outlet, said flow channel having a width and a height and at least a detection area configured to detect analytes trapped on functionalized beads flowing within said flow channel, a first electrode assembly and a second electrode assembly arranged in said flow channel, said first and second electrode assemblies being configured to generate under an appropriate electric tension therebetween an electric field drawing said beads to said detection area by dielectrophoretic forces, wherein said first electrode assembly is constituted by a first row of parallel pillars extending over said height of the flow channel and connected together by a first connecting line, said second electrode assembly is constituted by a second row of parallel pillars extending over said height of the flow channel and connected together by a second connecting line, wherein the pillars of said first and second rows are arranged alternately and parallelly one to the other with a gap therebetween so as to form a common row, said common row being configured to generate, under an appropriate electric tension between said first and second connecting lines, an electrical field preventing said beads to cross said common row and forcing them to slide along said common row until they reach the detection area, wherein the pillars of said first row and said second row are alternately aligned in a first common row crossing obliquely the entire width of said flow channel, thereby forming a first concentration line guiding beads toward a first detection area located at vicinity of a side wall of said flow channel, where they are clustered and concentrated, and wherein the flow channel is further provided with at least a further common row of parallel pillars of electrode assemblies crossing said flow channel in transverse direction, forming at least one incubation line.

8. The dielectrophoretic detection device according to claim 7, wherein said at least one incubation line is located upstream of said first concentration line in said flow channel.

9. A dielectrophoretic detection device comprising a chip, said chip comprising a flow channel having at least one inlet and one outlet, said flow channel having a width and a height and at least a detection area configured to detect analytes trapped on functionalized beads flowing within said flow channel, a first electrode assembly and a second electrode assembly arranged in said flow channel, said first and second electrode assemblies being configured to generate under an appropriate electric tension therebetween an electric field drawing said beads to said detection area by dielectrophoretic forces, wherein said first electrode assembly is constituted by a first row of parallel pillars extending over said height of the flow channel and connected together by a first connecting line, said second electrode assembly is constituted by a second row of parallel pillars extending over said height of the flow channel and connected together by a second connecting line, wherein the pillars of said first and second rows are arranged alternately and parallelly one to the other with a gap therebetween so as to form a common row, said common row being configured to generate, under an appropriate electric tension between said first and second connecting lines, an electrical field preventing said beads to cross said common row and forcing them to slide along said common row until they reach the detection area, and wherein:
the pillars of said first and said second rows are alternately aligned in a first common row crossing obliquely the entire or partial width of said flow channel, thereby forming a first concentration line guiding beads toward a first detection area;
the flow channel is provided with a first, a second or more concentration lines guiding beads toward one or more detection areas; and
said flow channel is further provided with at least one area of spatial segregation of said beads on a bead size basis downstream of the one or more detection areas, said one or more detection areas being further configured to focus said beads, which are clustered and concentrated by the one or more concentration lines, on a defined location upstream and at vicinity of the at least one area of spatial segregation of said beads on a bead size basis, thereby forming at least one focus area.

10. The dielectrophoretic detection device according to claim 9, wherein the functionalized beads are sorted by the at least one area of spatial segregation on a bead size basis and are concentrated and clustered according to their size, each cluster of sorted beads being located in a specific area being an accumulation zone located downstream the one or more areas of spatial segregation.

* * * * *